(12) United States Patent
Liu et al.

(10) Patent No.: US 12,337,409 B2
(45) Date of Patent: Jun. 24, 2025

(54) FRICTION STIR WELDING APPARATUS AND METHOD

(71) Applicant: SOUTHEAST UNIVERSITY, Nanjing (CN)

(72) Inventors: Xiaochao Liu, Nanjing (CN); Zhonghua Ni, Nanjing (CN); Jingyue Luo, Nanjing (CN); Xianjun Pei, Nanjing (CN); Yongzhe Li, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 18/945,601

(22) Filed: Nov. 13, 2024

(65) Prior Publication Data

US 2025/0065437 A1    Feb. 27, 2025

Related U.S. Application Data

(63) Continuation of application No. PCT/CN2023/084308, filed on Mar. 28, 2023.

(30) Foreign Application Priority Data

Sep. 15, 2022   (CN) .......................... 202211131055.7

(51) Int. Cl.
*B23K 20/12* (2006.01)
*B23K 20/26* (2006.01)

(52) U.S. Cl.
CPC ............ *B23K 20/125* (2013.01); *B23K 20/26* (2013.01)

(58) Field of Classification Search
CPC ........................................... B23K 20/122–128
See application file for complete search history.

(56) References Cited

U.S. PATENT DOCUMENTS 6,199,745 B1 *   3/2001   Campbell ............ B23K 20/126
                                                          228/2.1
6,516,992 B1 *   2/2003   Colligan ............. B29C 65/0681
                                                          228/222

(Continued)

FOREIGN PATENT DOCUMENTS

CN          101982284 A       3/2011
CN          206854839 U       1/2018

(Continued)

*Primary Examiner* — Keith Walker
*Assistant Examiner* — Carlos J Gamino
(74) *Attorney, Agent, or Firm* — Bayramoglu Law Offices LLC (57) ABSTRACT

A friction stir welding apparatus includes a hollow stirring bar, a clamping mechanism, a welding machine main shaft, a supporting carriage, a cooling system, a coolant tank, a guide rail, and pipes. The cooling system is connected with the outer surface of the welding machine main shaft through two sealed bearings; the clamping mechanism is connected with the welding machine main shaft; the clamping mechanism clamps one end of the stirring bar; the other end of the stirring bar penetrates the welded workpiece to engage with the supporting carriage; the guide rail is installed below the supporting carriage; the pipes includes a first pipe and a second pipe; one end of the first pipe is connected with the outlet of the tank, and the other end of the first pipe is connected with the inlet of the cooling system. The second pipe returns the cooling medium to the tank.

5 Claims, 8 Drawing Sheets (56) References Cited

U.S. PATENT DOCUMENTS

| | | | |
|---|---|---|---|
| 7,854,362 B2* | 12/2010 | Stol ................ | B23K 20/125 |
| | | | 228/112.1 |
| 10,155,282 B2* | 12/2018 | Kato ................ | B23K 20/122 |
| 2005/0006438 A1* | 1/2005 | Andersson ......... | B23K 20/1245 |
| | | | 228/112.1 |
| 2006/0043151 A1* | 3/2006 | Stol ................ | B23K 20/1255 |
| | | | 228/2.1 |
| 2015/0209895 A1* | 7/2015 | Matlack ............ | B23K 20/1225 |
| | | | 228/2.1 |
| 2019/0126385 A1* | 5/2019 | Odakura ............ | B23Q 11/14 |
| 2019/0299325 A1* | 10/2019 | Landmark .......... | B23K 20/125 |
| 2023/0311241 A1* | 10/2023 | Miyawaki .......... | B23K 20/126 |
| | | | 228/112.1 |
| 2024/0189936 A1* | 6/2024 | Shemkunas ........ | B23K 31/022 |
| 2025/0091155 A1* | 3/2025 | Shemkunas ........ | B23K 20/1255 |

FOREIGN PATENT DOCUMENTS

| | | | | |
|---|---|---|---|---|
| CN | 207272424 U | | 4/2018 | |
| CN | 110524105 A | | 12/2019 | |
| CN | 108044229 B | | 3/2020 | |
| CN | 111761198 A | * | 10/2020 | ......... B23K 20/1245 |
| CN | 112122768 A | | 12/2020 | |
| CN | 213469953 U | | 6/2021 | |
| CN | 113172332 A | | 7/2021 | |
| CN | 113210837 A | | 8/2021 | |
| CN | 110524105 B | | 5/2022 | |
| CN | 115582615 A | | 1/2023 | |
| JP | 11291065 A | * | 10/1999 | ......... B23K 20/1235 |
| WO | 2012101786 A1 | | 8/2012 | |

* cited by examiner

FIG. 14

FRICTION STIR WELDING APPARATUS AND METHOD

CROSS-REFERENCE TO THE RELATED APPLICATIONS

This application is the continuation application of International Application No. PCT/CN2023/084308, filed on Mar. 28, 2023, which is based upon and claims priority to Chinese Patent Application No. 202211131055.7, filed on Sep. 15, 2022, the entire contents of which are incorporated herein by reference.

TECHNICAL FIELD

The present disclosure relates to the field of friction stir welding technologies and in particular to a novel welding tool, and corresponding friction stir welding apparatus and method.

BACKGROUND

In 1991, The Welding Institute invented friction stir welding. This welding technology invention is continuously making contributions to the progress of the world's manufacturing technologies. As a novel solid-state welding process, this technology has the advantages of environmental protection, no pollution, low residual stress, small workpiece distortion, and the like as compared with the conventional fusion welding method, and therefore is widely applied to the joining of multiple metal materials such as aluminum alloy, magnesium alloy, copper alloy, steel, titanium alloy, composite materials, and others. Over the years, friction stir welding has drawn much attention from the manufacturing industry due to its technical features of excellent quality, high efficiency, energy saving, and no pollution. The friction stir welding technology has been increasingly applied to many high-tech fields such as aviation, aerospace, nuclear energy, ocean development, and the like, and many industrial sectors such as power, machine manufacturing, petroleum drilling auto manufacturing, and the like.

The friction stir welding uses friction heat and plastic deformation heat as welding heat sources. In this case, one welding tool shaped like a cylinder or another shape penetrates the joint seam between the workpieces and rotates at high speed such that the welding tool generates friction with the to-be-welded workpiece material thereby heating and softening the material at the welding position and simultaneously stirring the material to create a plastic flow, to complete a welding process.

However, since the welding tool needs to penetrate the workpiece and rotate to generate the friction heat, the welding tool suffers an extremely harsh service environment and tends to have problems of wear, fracture, and the like. Furthermore, the welding tool, being a non-consumable component, has strength and wear resistance far higher than those of the welded workpiece, resulting in high manufacturing costs for the welding tool. Especially, when welding high-melting-point materials, it is necessary to use a welding tool made of a refractory material including tungsten-based, cobalt-based, molybdenum-based, nickel-based alloys and Polycrystalline Cubic Boron Nitride (PCBN). These materials are costly and difficult to process. Moreover, when the length of the tool pin does not match the thickness of the welded material, the weld root is not fully stirred, leading to incomplete penetration, which significantly reduces the mechanical performance of the joint.

For the above reasons, the invention patent CN213469953U discloses an air-cooled stationary shoulder, a friction stir welding tool and apparatus, wherein multiple air passages are set in a stationary shoulder, with outlets of the passages located on a cooperating surface in contact with the stirring pin, and thus the stationary shoulder is air-cooled. This apparatus can increase the rigidity of the stirring pin and reduce the bending degree of the welding tool in the welding process, but the wear of the welding tool is unavoidable. The invention patent CN108044229B discloses a water-cooled friction stir welding apparatus made of a high-melting-point material, wherein by cooling a tool handle with the water-cooled apparatus, the cooling for the main shaft and the welding tool can be achieved, which lowers the requirements for the welding tool clamping part—transition material and extends the service life of the welding tool. This solution also fails to prevent wear of the stirring pin, and this apparatus indirectly cools the welding tool through a heat transfer effect of a transitional sleeve, resulting in a relatively weak cooling effect. The invention patent CN110524105B discloses a welding tool inducing a plastic vortex in a workpiece, wherein welding is carried out by vortex movement. While this avoids wear on the stirring pin, the depth of the induced vortex is limited, limiting the thickness of weldable workpiece thickness.

SUMMARY

Technical problem: the technical problem to be solved by the present disclosure is to provide a friction stir welding apparatus and method, wherein a low-cost consumable stirring bar is used to replace a conventional stirring pin to reduce the manufacturing costs of the welding tool; during the welding process, a cooling medium is introduced into the center of the stirring bar to apply forced cooling to avoid the fracture or failure of the stirring bar, increasing the welding reliability. Furthermore, by using the stirring bar made of low-cost consumable material, full penetration can be achieved for any workpiece thickness, to improve the welding quality and welding efficiency.

Technical solution: in order to solve the above technical problem, based on a first aspect, one or more embodiments of the present disclosure provide a friction stir welding apparatus, comprising a stirring bar provided with a hollow cavity, a clamping mechanism, a welding machine main shaft, a supporting carriage, a cooling system, a coolant tank, a guide rail and a guide pipe, wherein the cooling system is connected with an outer surface of the welding machine main shaft through a sealed bearing; the clamping mechanism is connected with the welding machine main shaft; the clamping mechanism clamps the first end of the stirring bar; the second end of the stirring bar penetrates through the welded workpiece to fit with the supporting carriage; the guide rail is set below the supporting carriage; the guide pipe comprises a first guide pipe and a second guide pipe; the first end of the first guide pipe is connected with the outlet of the coolant tank, and the second end of the first guide pipe is connected with the inlet of the cooling system; the first end of the second guide pipe is connected with the cooling liquid outlet of the supporting carriage and the second end of the second guide pipe is connected with the inlet of the coolant tank; the cooling system, the welding machine main shaft, the clamping mechanism, the stirring bar, the supporting carriage and the coolant tank are sequentially communicated to form a cooling liquid circulation circuit.

In a preferred embodiment, the stirring bar has the exactly same material as the welded workpiece or contains the same major metal elements as the welded workpiece; a stepped structure is set on the outer surface of the stirring bar, and a first through-hole vertically penetrating through is set in the stirring bar; the stepped structure is a cone frustum structure with a diameter of the lower-end surface equal to the diameter of the stirring bar or a cone frustum structure with a diameter of the lower-end surface greater than the diameter of the stirring bar; the diameter of the upper-end surface of the stepped structure is greater than the diameter of the lower-end surface; a cone angle $\alpha$ is formed by the upper-end surface and the lower-end surface of the stepped structure, wherein $0°<\alpha\leq 45°$; the height of the stepped structure is equal to the thickness of the welded workpiece.

In a preferred embodiment, the clamping mechanism comprises a tool handle and a sleeve connected up and down; a second through-hole is set in the center of the tool handle; the tool handle is connected with the welding machine main shaft; a cavity is set inside the sleeve, and threaded through-holes are set on the sidewall of the sleeve; the second through-hole is in communication with the cavity; the cavity is used to sleeve the stirring bar; fasteners are screwed into the threaded through-holes to fix the stirring bar; the hollow cavity of the stirring bar is in communication with the second through-hole of the tool handle.

In a preferred embodiment, the cavity has a height equal to the distance from the upper-end surface of the stepped structure to a top-end of the stirring bar; the outer diameter of the lower-end surface of the sleeve is larger than or equal to the diameter of the upper surface of the hole opened on the welded workpiece.

In a preferred embodiment, the supporting carriage comprises a frame mechanism, an upper rotary supporting structure and a lower rotary supporting structure, wherein the upper rotary supporting structure and the lower rotary supporting structure are located on the frame mechanism; the upper rotary supporting structure and the lower rotary supporting structure are coaxially set; the inner side of the upper rotary supporting structure is in clearance fit with the stirring bar; the upper surface of the lower rotary supporting structure is in contact with the lower end surface of the stirring bar; the supporting carriage is further provided with a third through-hole, wherein the third through-hole vertically penetrates through the supporting carriage; the third through-hole is set in the center of the supporting carriage; the third through-hole is in communication with the hollow cavity of the stirring bar, and the bottom end of the third through-hole forms the cooling liquid outlet of the supporting carriage; the supporting carriage moves in synchronization with the stirring bar through the guide rail.

In a preferred embodiment, each of the upper rotary supporting structure and the lower rotary supporting structure is a cylindrical roller bearing structure; the upper rotary supporting structure has an inner diameter larger than or equal to the diameter of the stirring bar; the lower rotary supporting structure has an inner diameter less than or equal to ¾ of the diameter of the stirring bar.

In a preferred embodiment, a fourth through-hole is set on a sidewall of the welding machine main shaft, and a hollow chamber is set in the center of the welding machine main shaft, wherein the hollow chamber is in communication with the fourth through-hole; the cooling system comprises two upper and lower sealed bearings sleeved on the welding machine main shaft to form a cavity in middle and wrap the fourth through-hole on the sidewall of the welding machine main shaft; the fourth through-hole of the welding machine main shaft is in communication with the second through-hole of the clamping mechanism.

In a second aspect, one or more embodiments of the present disclosure provide a friction stir welding method, including the following steps:

Step 10), a round hole with a diameter equal to the diameter of the stirring bar is formed on the surface of the welded workpiece;

Step 20), the welding machine main shaft drives the clamping mechanism and the stirring bar to rotate and move downward simultaneously; when the distance between the stepped structure and the welded workpiece is 5 mm to 10 mm, a cooling liquid is introduced;

Step 30), when the upper surface of the stepped structure aligns with the upper surface of the welded workpiece, the stirring bar stops moving downward; at this time, the stirring bar penetrates through the upper rotary supporting structure of the supporting carriage, with the lower end surface of the stirring bar contacting the upper surface of the lower rotary supporting structure;

Step 40), the welding machine main shaft drives the clamping mechanism and the stirring bar to rotate and move along the welding direction; the supporting carriage moves in synchronization with the stirring bar;

Step 50), when welding is completed, the welding machine main shaft is moved upward at the time of rotation of the clamping mechanism and stirring bar, to move the stirring bar out from the welded workpiece, and then the introduction of the cooling liquid is stopped.

In a preferred embodiment, in step 20), the cooling liquid is selected from water, oil, liquid nitrogen, and liquid carbon dioxide.

In a preferred embodiment, in step 20), the cooling liquid circulates through the cooling system, the welding machine main shaft, the clamping mechanism, the stirring bar, the supporting carriage, and the coolant tank.

Beneficial effects: compared with the prior art, the technical solution of the present disclosure has the following beneficial effects: in the present disclosure, a stirring bar made of the same or similar material as the welded workpiece is used to replace the conventional welding tool and penetrate the workpiece, which solves the problems of susceptibility of wear and fracture of the conventional friction stir welding tool and incomplete penetration of the bottom of the workpiece and ensures that the weldable thickness of the workpiece is not limited by the length of the stirring pin, thereby improving the mechanical performance of the welding joint and the welding efficiency. Furthermore, by introducing the cooling liquid, the rigidity of the stirring bar is increased to prevent the stirring bar from softening due to excessively high temperature and hence discontinuing welding, to maintain the welding stability. The upper rotary supporting structure of the supporting carriage prevents the material in the stir zone from flowing downward, and the guide rail is used to direct the movement direction of the supporting carriage to ensure the supporting points are always exactly below the welding tool and reduce the frictional force generated during movement, improving the welding efficiency and welding quality.

Numerals of the drawings are described below: 1. stirring bar, 2. clamping mechanism, 3. welding machine main shaft, 4. supporting carriage, 5. cooling system, 6. coolant tank, 7. guide rail, 8. guide pipe, 1-1. stepped structure, 2-1 tool handle, 2-2. second through-hole, 2-3. sleeve, 2-4. cavity, 2-5. threaded through-hole, 4-1. upper rotary supporting structure, 4-2. lower rotary supporting structure, 4-3. third through-hole, 9. first through-hole, 10. sealed bearing, 11. cone frustum structure with a diameter of the lower-end surface greater than the diameter of the stirring bar, 12. dual convex surface arc structure, 13. dual concave surface arc structure, 14. outer surface of the welding machine main shaft, 15. first end of the stirring bar, 16. second end of the stirring bar, 17. first guide pipe, 18. second guide pipe, 19. first end of the first guide pipe, 20. second end of the first guide pipe, 21. first end of the second guide pipe, 22. second end of the second guide pipe, 23. inlet of the cooling system, 24. inlet of the coolant tank, 25. outlet of the coolant tank, 26. cooling liquid outlet of the supporting carriage, 27. frame mechanism, 28. inner side of the upper rotary supporting structure, 29. upper surface of the lower rotary supporting structure, 30. lower-end surface of the stirring bar, 31. lower-end surface of cone frustum structure a having diameter equal to the diameter of the stirring bar, 32. diameter of stirring bar, 33. lower-end surface of cone frustum structure a having a diameter greater than the diameter of the stirring bar, 34. upper-end surface of the stepped structure, 35. top end of the stirring bar, 36. outer diameter of the lower-end surface of the sleeve, and 37. lower-end surface of the sleeve.

DETAILED DESCRIPTION OF THE EMBODIMENTS

The technical solution of the present disclosure will be detailed below in combination with drawings.

Figure 1:
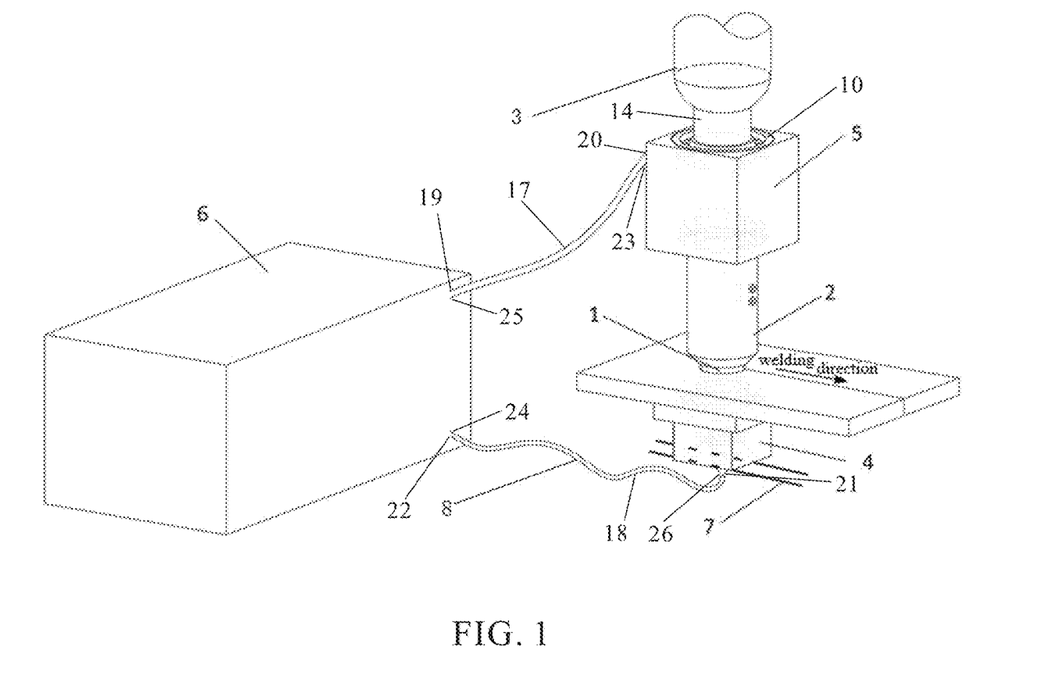
FIG. 1 is a schematic diagram illustrating an apparatus according to an embodiment of the present disclosure.
Figure 2:
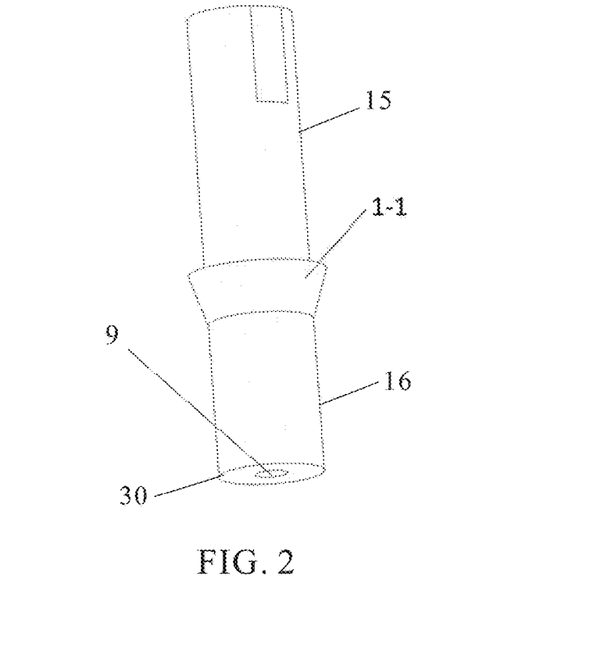
FIG. 2 is a schematic diagram illustrating a stirring bar with a conical frustum-shaped stepped structure with a diameter of a lower-end surface equal to the diameter of the stirring bar according to an embodiment of the present disclosure.
Figure 3:
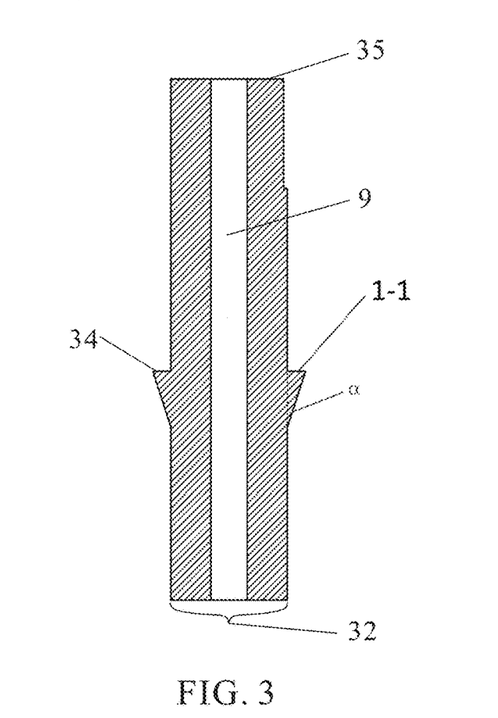
FIG. 3 is a structural sectional view illustrating a stirring bar with a cone frustum-shaped stepped structure with a diameter of a lower-end surface equal to the diameter of the stirring bar according to an embodiment of the present disclosure.

As shown in FIGS. 1-3, an embodiment of the present disclosure provides a friction stir welding apparatus, which includes a stirring bar 1 provided with a hollow cavity, also referred to as a first through-hole, 9, a clamping mechanism 2, a welding machine main shaft 3, a supporting carriage 4, a cooling system 5, a coolant tank 6, a guide rail 7 and a guide pipe 8. The cooling system 5 is connected with an outer surface 14 of the welding machine main shaft 3 through a sealed bearing 10. The clamping mechanism 2 is connected with the welding machine main shaft 3. The clamping mechanism 2 clamps a first end 15 of the stirring bar 1, and a second end 16 of the stirring bar 1 penetrates through a welded workpiece to fit with the supporting carriage 4. The guide rail 7 is set below the supporting carriage 4. The guide pipe 8 includes a first guide pipe 17 and a second guide pipe 18. A first end 19 of the first guide pipe is connected with an outlet 25 of the coolant tank 6, and a second end 20 of the first guide pipe is connected with an inlet 23 of the cooling system 5. A first end 21 second guide pipe is connected with a cooling liquid outlet 26 of the supporting carriage 4 and a second end 22 of the second guide pipe is connected with an inlet 24 of the coolant tank 6. The cooling system 5, the welding machine main shaft 3, the clamping mechanism 2, the stirring bar 1, the supporting carriage 4, and the coolant tank 6 are sequentially connected to form a cooling liquid circulation circuit.

In the friction stir welding apparatus with the above structure, the welding tool made of low-cost consumable material is used, making the structure simpler and the costs lower; the stirring bar made of the same or similar material as the welded workpiece is used to weld the workpiece with full penetration; further, the double rotary supporting structures cooperate with the stirring bar to conduct welding, which not only reduces the costs but also ensures the weld quality and welding efficiency. For example, both the materials of the welded workpiece and the stirring bar are titanium alloy.

Before welding, a round hole with a diameter equal to that of the stirring bar is first set on the welded workpiece, and then the welding tool is rotated and pressed down. When a stepped structure 1-1 is coming in contact with a surface of the welded workpiece, a cooling liquid is introduced; when the upper surface of the stepped structure 1-1 overlaps with the upper surface of the welded workpiece, pressing down is over, and at this time, the bottom end of the stirring bar 1 penetrates through the welded workpiece and the upper rotary supporting structure 4-1 to contact with the upper surface of the lower rotary supporting structure 4-2. At this time, the stirring bar 1 moves along the welding direction, and supporting carriage 4 moves in synchronization with the stirring bar 1, to carry out welding. During the welding process, stirring bar 1 rotates at high speed to rub and stir the workpiece material to generate friction heat and plastic deformation heat, hence heating and softening the to-be-welded material around the stirring bar and forming a plastic flow under the action of the stirring bar. In addition, the cooling liquid flows through the center of the stirring bar 1 to achieve forced cooling on the stirring bar, greatly increasing the rigidity of the stirring bar 1, avoiding softening of the stirring bar due to excessively high temperature, and maintaining the stability of the welding process. When the stirring bar 1 moves along the to-be-welded seam direction, the plastic material ahead of the stirring bar 1 is brought to the back by the rotating stirring bar. In this process, the original interface between the workpieces is broken and the exposed fresh metals are permanently connected by metallurgical processes such as recrystallization, diffusion, chemical reaction, and the like, ensuring the welding efficiency and the weld quality.

Compared with the existing friction stir welding tool, the stirring bar is made of the same or similar material as that of the workpiece in the present disclosure, and the stirring bar as a low-cost consumable material can be obtained more easily and is lower in the costs. After rotatably penetrating the workpiece, the stirring bar can, due to its same or similar material as that of the workpiece, be naturally welded together with the workpiece while maintaining a given rotation speed. In this case, when the plastic material between the stirring bar and the workpiece makes circumferential movement, there is a speed gradient along the radial direction. To form a stable plastic flow field, the stirring bar needs to continuously transmit momentum to the workpiece. However, the stirring bar may soften under the action of the friction heat and therefore, the capability of its momentum output is also lowered, resulting in system instability. Therefore, the present disclosure proposes a solution in which a cooling liquid is introduced to the center of the stirring bar to achieve forced cooling on the stirring bar, such that the temperature distribution in the stirring bar reaches a dynamic equilibrium between "friction heating-forced cooling". In this way, the temperature of the center of the stirring bar can be reduced to some extent and the rigidity of the stirring bar can be increased and therefore the momentum output capability of the stirring bar can also be increased. In this case, the plastic flow field between the stirring bar and the workpiece can be maintained in a quasi-steady state during the welding process.

As shown in FIGS. 2, 3, and 9 to 14, in a preferred embodiment, the stirring bar 1 has the exactly same material as the welded workpiece or contains the same major metal elements as the welded workpiece; the stepped structure 1-1 is set on the outer surface of the stirring bar 1, and a first through-hole 9 vertically penetrating through is set in the stirring bar 1; the stepped structure 1-1 is a cone frustum structure with a diameter of the lower-end surface 31 equal to the diameter 32 of the stirring bar 1 or a cone frustum structure 11 with a diameter of the lower-end surface 33 greater than the diameter of the stirring bar 1; the diameter of the upper-end surface 34 of the stepped structure 1-1 is greater than the diameter of the lower-end surface; a cone angle α is formed by the upper-end surface and the lower-end surface of the stepped structure 1-1, where $0°<α≤45°$; the height of the stepped structure 1-1 is equal to the thickness of the welded workpiece. The stirring bar 1 having the exactly same material as the welded workpiece or containing the same major metal elements as the welded workpiece has the advantages of simple structure and easy availability of material, reducing the costs. Furthermore, the stirring bar 1 penetrates through the welded workpiece during welding, which solves the problems of ease of wear and fracture of the conventional friction stir welding tool and lack of penetration of the bottom of the workpiece. The side surface of the cone frustum of the stepped structure 1-1 may also be a dual concave surface arc structure or a dual convex surface arc structure, which can be used to adjust the heat generation efficiency at different moments during a press-down stage to optimize a welding temperature field. For example, if the workpiece is of pure aluminum, the stirring bar may be of pure aluminum or aluminum alloy; if the workpiece is of low carbon steel, the stirring bar may be of alloy steel, that is, the stirring bar may be slightly harder than the workpiece but should have the same major metal elements as the workpiece. In this case, the stirring bar is still a low-cost consumable material.

Figure 4:
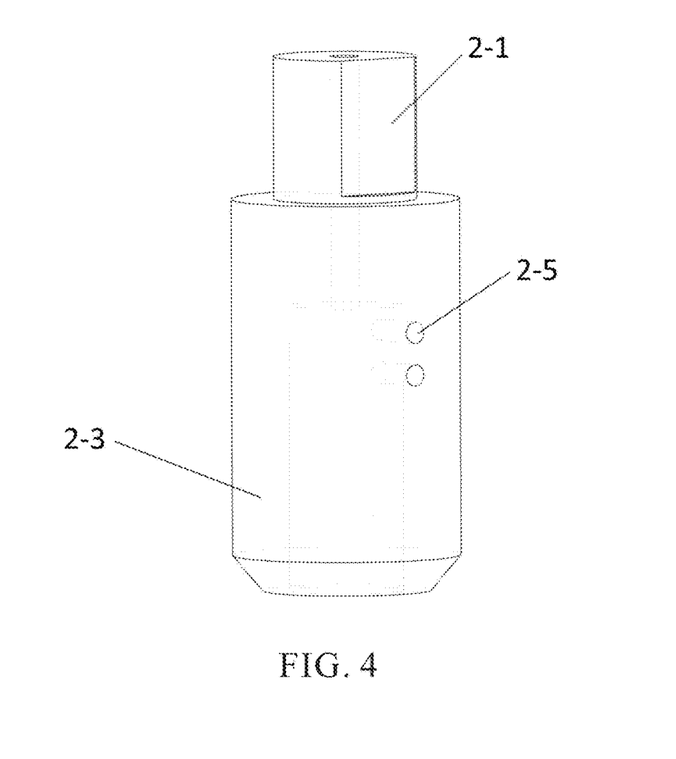
FIG. 4 is a schematic diagram illustrating a clamping mechanism according to an embodiment of the present disclosure.
Figure 5:
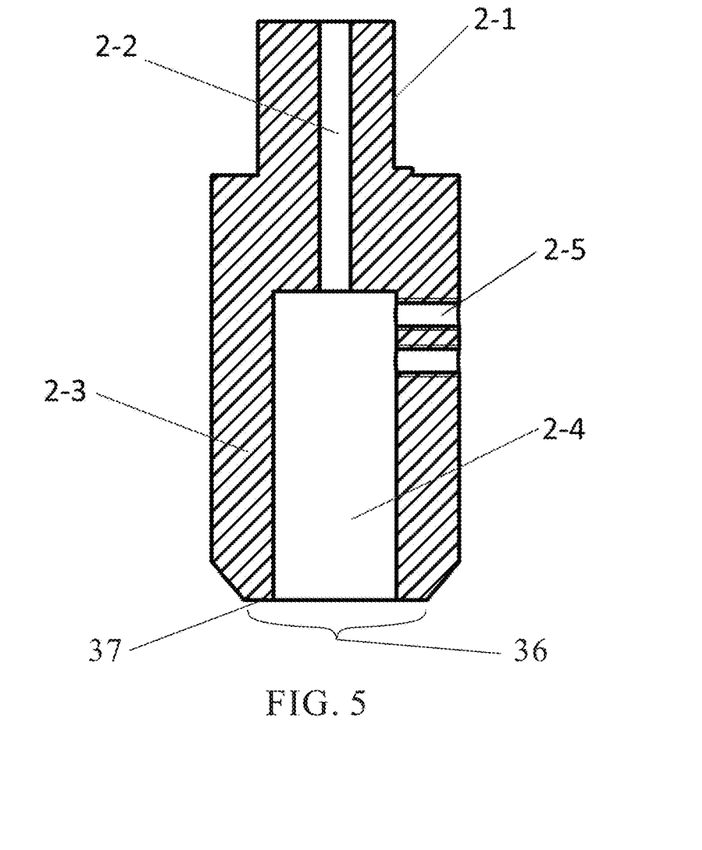
FIG. 5 is a structural sectional view illustrating a clamping mechanism according to an embodiment of the present disclosure.

As shown in FIGS. 4 and 5, in a preferred embodiment, the clamping mechanism 2 includes a tool handle 2-1 and a sleeve 2-3 connected up and down; a second through-hole 2-2 is set in the center of the tool handle 2-1; the tool handle 2-1 is connected with the welding machine main shaft 3; a cavity 2-4 is set inside the sleeve 2-3 and threaded through-holes 2-5 are set on the sidewall of the sleeve 2-3; the second through-hole 2-2 is in communication with the cavity 2-4; the cavity 2-4 is used to sleeve the stirring bar 1; fasteners are screwed into the threaded through-holes 2-5 to fix the stirring bar 1; the hollow cavity of the stirring bar 1 is in communication with the second through-hole 2-2 of the tool handle 2-1. The clamping mechanism 2 is used to fix the stirring bar 1 such that the stirring bar 1 is more stable during welding, ensuring the welding quality. In addition, the clamping mechanism 2 is connected with the cooling system and provided with the second through-hole 2-2. During the welding, the cooling liquid enters the center of the stirring bar 1 through the second through-hole 2-2 to lower the temperature of the stirring bar 1 at work and ensure the welding continuity and efficiency.

In a preferred embodiment, the cavity 2-4 has a height equal to the distance from the upper-end surface of the stepped structure 1-1 to the top end 35 of the stirring bar 1; the outer diameter 36 of the lower-end surface 37 of the sleeve 2-3 is greater than or equal to the diameter of the upper surface of the hole on the welded workpiece, aiming to prevent the material in the stir zone from overflowing during welding. Furthermore, when the outer diameter of the lower-end surface of the sleeve 2-3 is increased, it is possible to increase the outer diameter of the stirring bar 1. During the welding process, the stirring effect of the stirring bar 1 for the workpiece can be guaranteed, improving the welding efficiency.

Figure 6:
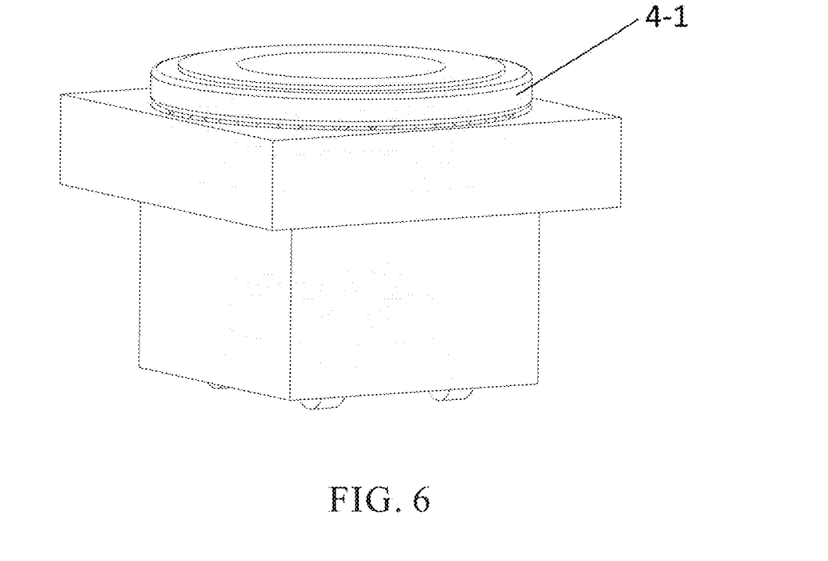
FIG. 6 is a schematic diagram illustrating a supporting carriage according to an embodiment of the present disclosure.
Figure 7:
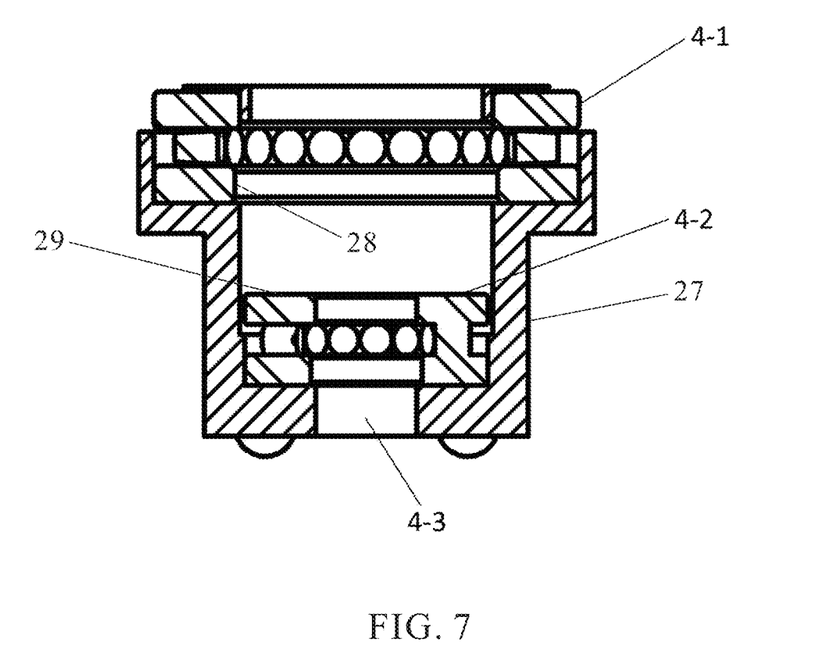
FIG. 7 is a structural sectional view illustrating a supporting carriage according to an embodiment of the present disclosure.

As shown in FIGS. 6 and 7, in a preferred embodiment, the supporting carriage 4 includes a frame mechanism 27 and an upper rotary supporting structure 4-1 and a lower rotary supporting structure 4-2 on the frame mechanism; the upper rotary supporting structure 4-1 and the lower rotary supporting structure 4-2 are coaxially set; the inner side 28 of the upper rotary supporting structure 4-1 is in clearance fit with the stirring bar 1; the upper surface 29 of the lower rotary supporting structure 4-2 is in contact with the lower-end surface 30 of the stirring bar 1; the supporting carriage 4 is further provided with a third through-hole 4-3 which vertically penetrates through the supporting carriage 4; the third through-hole 4-3 is set in the center of the supporting carriage 4; the third through-hole 4-3 is in communication with the hollow cavity of the stirring bar 1, and the bottom end of the third through-hole 4-3 forms a cooling liquid outlet of the supporting carriage 4; the supporting carriage 4 moves in synchronization with the stirring bar 1 through the guide rail 7. The stirring bar 1 penetrates through the welded workpiece and the upper rotary supporting structure 4-1 to come in contact with the upper surface of the lower rotary supporting structure 4-2. During welding, the upper rotary supporting structure 4-1 achieves a limitation effect on the stirring bar 1 such that the stirring bar 1 can be fixed up and down during the welding movement process, generating a better welding effect. Further, the movement direction of the supporting carriage 4 is directed by the guide rail 7 to ensure the supporting points are always exactly below the welding tool, reducing the friction force generated during the welding movement and achieving a better welding effect.

In a preferred embodiment, the upper rotary supporting structure 4-1 and the lower rotary supporting structure 4-2 both are a cylindrical roller bearing structure; the upper rotary supporting structure 4-1 has an inner diameter greater than or equal to the diameter of the stirring bar 1; the lower rotary supporting structure 4-2 has an inner diameter less than or equal to ¾ of the diameter of the stirring bar 1. The stirring bar 1 penetrates through the upper rotary supporting structure 4-1 of the supporting carriage 4, with its bottom end located on the upper surface of the lower rotary supporting structure 4-2. The inner diameter of the upper rotary supporting structure 4-1 is made large enough such that the stirring bar 1 can penetrate through the upper rotary supporting structure 4-1 to be in contact with the surface of the lower rotary supporting structure 4-2, and the inner diameter of the lower rotary supporting structure 4-2 is made small enough such that it can support the stirring bar 1 and move in synchronization with the stirring bar 1, and the cooling liquid can be enabled to run through the third through-hole 4-3 into the coolant tank 6 via the inner diameter, stably achieving the continuation of the cooling liquid circulation and the welding.

In a preferred embodiment, a fourth through-hole is set on a sidewall of the welding machine main shaft 3, and a hollow chamber is set in the center of the main shaft, where the hollow chamber is in communication with the fourth through-hole; the cooling system 5 includes two upper and lower sealed bearings sleeved on the welding machine main shaft 3 to form a cavity in middle and wrap the fourth through-hole on the sidewall of the welding machine main shaft; the fourth through-hole of the welding machine main shaft 3 is in communication with the second through-hole 2-2 of the clamping mechanism 2 through the hollow chamber in the welding machine main shaft 3. Various components are in communication with each other and during the welding process, the cooling liquid can circulate continuously and stably and the rigidity of the stirring bar 1 can be continuously maintained without high-temperature softening. The welding process can be continuously carried out with better safety and stability.

An embodiment of the present disclosure further provides a friction stir welding method, which includes the following steps:

Step 10) a round hole with a diameter equal to that of the stirring bar 1 is drilled on the surface of the welded workpiece.

Figure 8A:
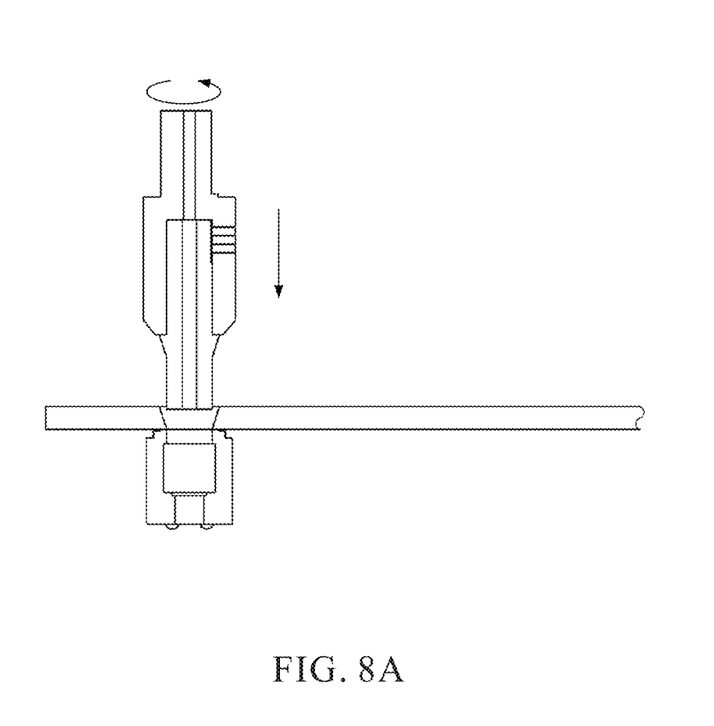
FIG. 8A is a schematic diagram illustrating that the clamping mechanism and the stirring bar rotate and move downward simultaneously in step 20) according to an embodiment of the present disclosure.
Figure 8B:
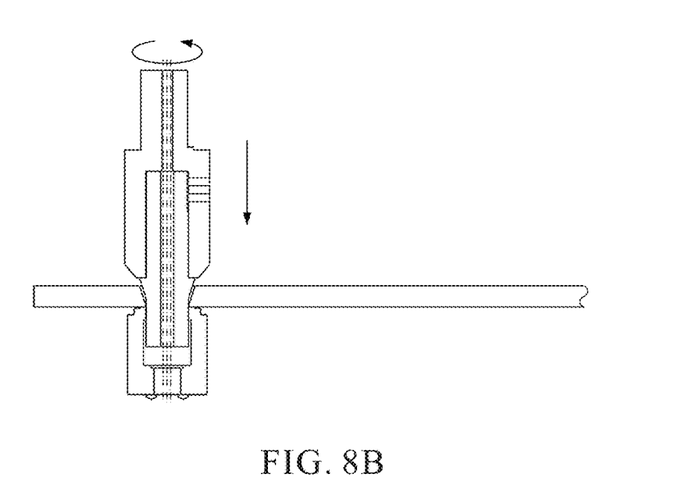
FIG. 8B is a schematic diagram illustrating the introduction of a cooling liquid in step 20) according to an embodiment of the present disclosure.

Step 20) as shown in FIGS. 8A and 8B, the welding machine main shaft 3 drives the clamping mechanism 2 and the stirring bar 1 to rotate and move downward simultaneously; when the distance between the stepped structure 1-1 and the welded workpiece is 5-10 mm, a cooling liquid is introduced.

Figure 8C:
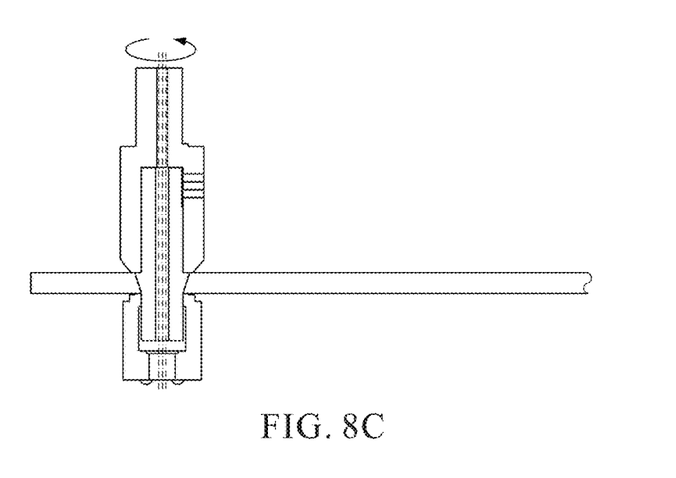
FIG. 8C is a schematic diagram of step 30) according to an embodiment of the present disclosure.

Step 30) as shown in FIG. 8C, when the upper surface of the stepped structure 1-1 is overlapped with the upper surface of the welded workpiece, the stirring bar 1 stops moving downward; at this time, the stirring bar 1 penetrates through the upper rotary supporting structure 4-1 of the supporting carriage 4, with the lower-end surface of the stirring bar 1 coming in contact with the upper surface of the lower rotary supporting structure 4-2.

Figure 8D:
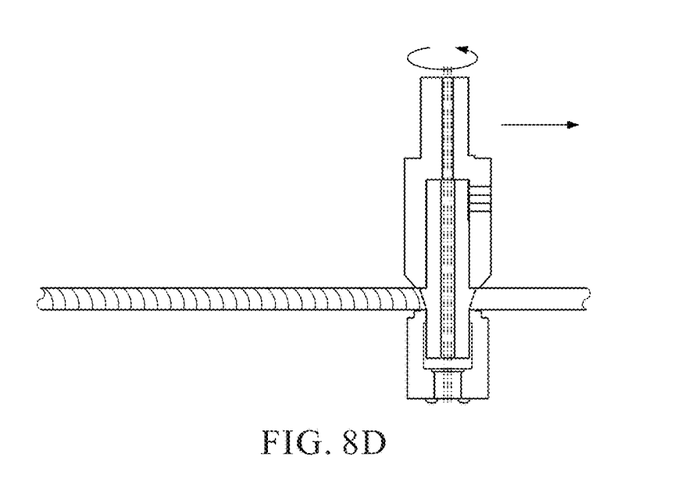
FIG. 8D is a schematic diagram of step 40) according to an embodiment of the present disclosure.
Figure 9:
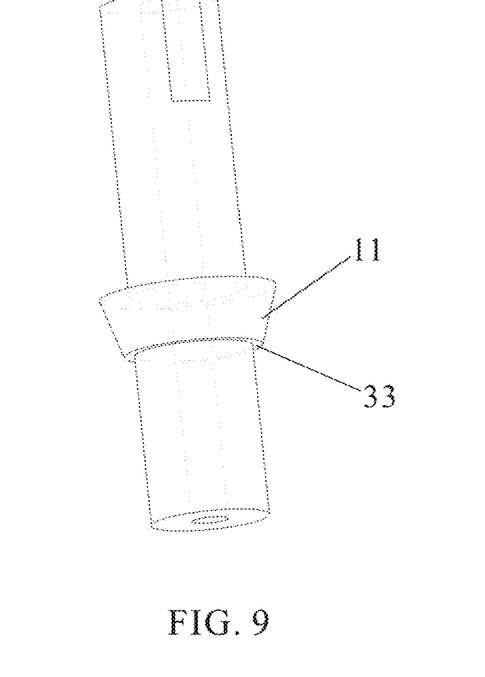
FIG. 9 is a schematic diagram illustrating a stirring bar with a conical frustum-shaped stepped structure with a diameter of a lower-end surface greater than the diameter of the stirring bar according to an embodiment of the present disclosure.
Figure 10:
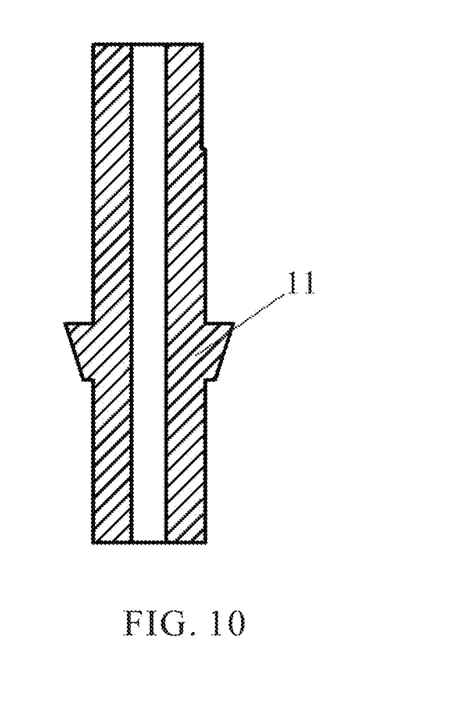
FIG. 10 is a structural sectional view illustrating a stirring bar with a conical frustum-shaped stepped structure with a diameter of a lower-end surface greater than the diameter of the stirring bar according to an embodiment of the present disclosure.
Figure 11:
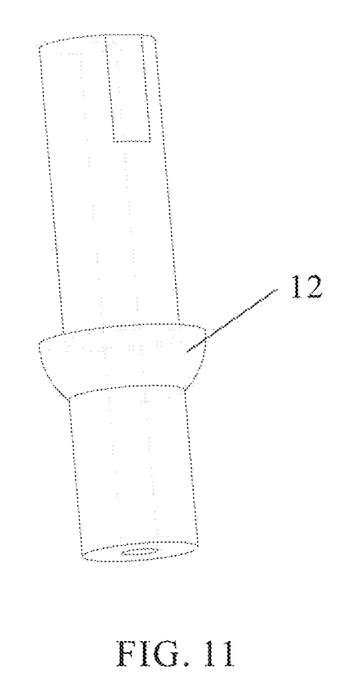
FIG. 11 is a schematic diagram illustrating a stirring bar with a stepped structure with a dual convex surface arc structure 12 according to an embodiment of the present disclosure.
Figure 12:
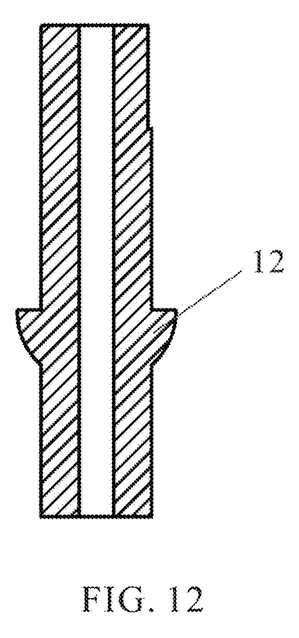
FIG. 12 is a structural sectional view illustrating a stirring bar with a stepped structure with a dual convex surface arc structure 12 according to an embodiment of the present disclosure.
Figure 13:
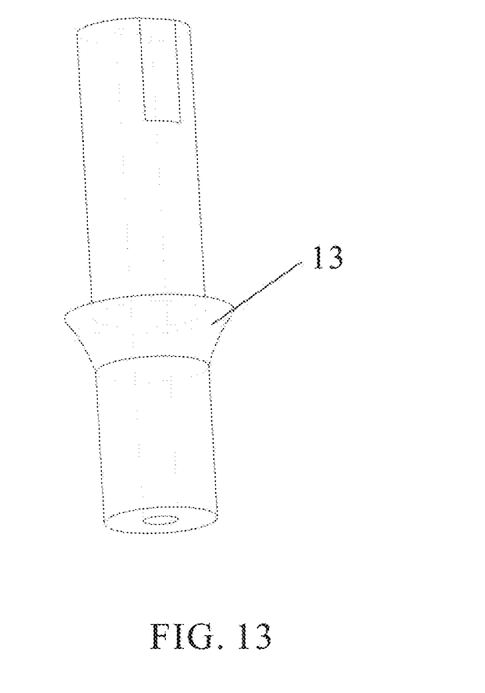
FIG. 13 is a schematic diagram illustrating a stirring bar with a stepped structure with a dual concave surface arc structure 13 according to an embodiment of the present disclosure.
Figure 14:
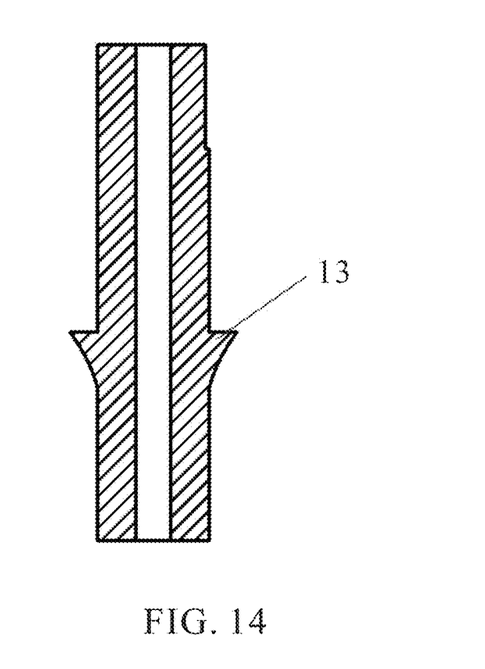
FIG. 14 is a structural sectional view illustrating a stirring bar with a stepped structure with a dual concave surface arc structure 13 according to an embodiment of the present disclosure.

Step 40), as shown in FIG. 8D, the welding machine main shaft 3 drives the clamping mechanism 2 and the stirring bar 1 to rotate and move along the welding direction for welding; the supporting carriage 4 moves in synchronization with the stirring bar 1.

Step 50), when the welding process is completed, the welding machine main shaft 3 is moved upward at the time of rotation of the clamping mechanism 2 and stirring bar 1, to move the stirring bar out from the welded workpiece and then the introduction of the cooling liquid is stopped.

In the friction stir welding method as mentioned above, the stirring bar 1 made of the same or similar material as the welded workpiece is used; during welding, the stirring bar 1 penetrates through the welded workpiece, which solves the problems of wear and fracture of the conventional friction stir welding tool and lack of penetration of the bottom of the workpiece. Further, the stirring bar 1 can be designed as a different size according to the actual requirements of the welded workpiece, such that the welding is free from the limitation of the size of the stirring bar 1, increasing the mechanical performance of the welded joint and welding efficiency. During welding, by introducing the cooling liquid, the welding apparatus is cooled, which ensures the rigidity of the stirring bar 1, and thus the stirring bar 1 will not discontinue the welding process due to softening resulting from excessively high temperature. Further, during the welding process, the cooling liquid continuously circulates, which maintains the continuity and stability of the welding process.

As a preferred embodiment, in step 20), the cooling liquid is one of water, oil, liquid nitrogen, or liquid carbon dioxide. A different cooling liquid can be selected based on actual situations and requirements to enable the entire apparatus to adapt to more working conditions, expanding larger application scope.

As a preferred embodiment, in Step 20), the cooling liquid circulates through the cooling system 5, the welding machine main shaft 3, the clamping mechanism 2, the stirring bar 1, the supporting carriage 4, and the coolant tank 6. During the welding process, the circulation of the cooling liquid ensures the welding apparatus is continuously cooled and the stirring bar 1 continuously maintains rigidity, resulting in better safety and stability in the welding process. The basic principles, main characteristics, and advantages of the present disclosure are described and outlined above. Those skilled in the arts should understand that the present disclosure is not limited by the above specific embodiments, and the above specific embodiments and the descriptions of the specification are used only to further describe the principles of the present disclosure. Without departing from the spirit and scope of the present disclosure, various changes and improvements can be made to the present disclosure. These changes and improvements fall within the scope of protection of the present disclosure. The scope of protection of the present disclosure is defined by the claims and their equivalents.

What is claimed is:

1. A friction stir welding apparatus comprising:
a stirring bar provided with a first through-hole;
a clamping mechanism;
a welding machine main shaft;
a supporting carriage;
a cooling system;
a coolant tank;
a guide rail; and
a guide pipe,
wherein
the cooling system is connected with an outer surface of the welding machine main shaft through a sealed bearing;
the clamping mechanism is connected with the welding machine main shaft;
the clamping mechanism clamps a first end of the stirring bar;
a second end of the stirring bar penetrates through a welded workpiece to fit with the supporting carriage;
the guide rail is set below the supporting carriage;
the guide pipe comprises a first guide pipe and a second guide pipe;
a first end of the first guide pipe is connected with an outlet of the coolant tank, and a second end of the first guide pipe is connected with an inlet of the cooling system;
a first end of the second guide pipe is connected with a cooling liquid outlet of the supporting carriage and a second end of the second guide pipe is connected with an inlet of the coolant tank;
the cooling system, the welding machine main shaft, the clamping mechanism, the stirring bar, the supporting carriage and the coolant tank are sequentially communicated to form a cooling liquid circulation circuit;
the supporting carriage comprises a frame mechanism, an upper rotary supporting structure and a lower rotary supporting structure, wherein the upper rotary supporting structure and the lower rotary supporting structure are located on the frame mechanism;
the upper rotary supporting structure and the lower rotary supporting structure are coaxially set;
an inner side of the upper rotary supporting structure is in clearance fit with the stirring bar;
an upper surface of the lower rotary supporting structure is in contact with a lower end surface of the stirring bar;
the supporting carriage is further provided with a third through-hole, wherein the third through-hole vertically penetrates through the supporting carriage;
the third through-hole is set in a center of the supporting carriage;
the third through-hole is in communication with the first through-hole of the stirring bar, and a bottom end of the third through-hole forms the cooling liquid outlet of the supporting carriage; and
the supporting carriage moves in synchronization with the stirring bar through the guide rail.

2. The friction stir welding apparatus of claim 1, wherein the stirring bar has exactly same material as the welded workpiece or contains same metal elements as the welded workpiece;
a stepped structure is set on an outer surface of the stirring bar, and the first through-hole vertically penetrates through the stirring bar;
the stepped structure is a cone frustum structure with a diameter of a lower-end surface equal to a diameter of the stirring bar or a cone frustum structure with the diameter of the lower-end surface greater than the diameter of the stirring bar;
a diameter of an upper-end surface of the stepped structure is greater than the diameter of the lower-end surface;
a cone angle $\alpha$ of either of said cone frustum structures is $0°<\alpha\leq45°$; and
a height of the stepped structure is equal to a thickness of the welded workpiece.

3. The friction stir welding apparatus of claim 1, wherein the clamping mechanism comprises a tool handle and a sleeve;
a second through-hole is set in a center of the tool handle;
the tool handle is connected with the welding machine main shaft;
a cavity is set inside the sleeve, and threaded through-holes are set on a sidewall of the sleeve;
the second through-hole is in communication with the cavity;
the cavity is used to sleeve the stirring bar;
fasteners are screwed into the threaded through-holes to fix the stirring bar; and
the first through-hole of the stirring bar is in communication with the second through-hole of the tool handle.

4. The friction stir welding apparatus of claim 3, wherein the cavity has a height equal to a distance from an upper-end surface of the stepped structure to a top-end of the stirring bar; and
an outer diameter of a lower-end surface of the sleeve is larger than or equal to a diameter of an upper surface of a hole opened on the welded workpiece.

5. The novel friction stir welding apparatus of claim 1, wherein
each of the upper rotary supporting structure and the lower rotary supporting structure is a cylindrical roller bearing structure;
the upper rotary supporting structure has an inner diameter larger than or equal to a diameter of the stirring bar; and
the lower rotary supporting structure has an inner diameter less than or equal to ¾ of the diameter of the stirring bar.

* * * * *